(12) United States Patent
Hodge (10) Patent No.: US 10,197,735 B2
(45) Date of Patent: Feb. 5, 2019

(54) OPTICAL FIBER TAPPING DEVICE

(75) Inventor: Malcolm H. Hodge, Chicago, IL (US)

(73) Assignee: Molex, LLC, Lisle, IL (US)

( * ) Notice: Subject to any disclaimer, the term of this patent is extended or adjusted under 35 U.S.C. 154(b) by 475 days.

(21) Appl. No.: 13/636,517

(22) PCT Filed: Mar. 23, 2011

(86) PCT No.: PCT/US2011/029625
§ 371 (c)(1),
(2), (4) Date: Nov. 27, 2012

(87) PCT Pub. No.: WO2011/119731
PCT Pub. Date: Sep. 29, 2011

(65) Prior Publication Data
US 2013/0129279 A1      May 23, 2013

Related U.S. Application Data (60) Provisional application No. 61/316,626, filed on Mar. 23, 2010.

(51) Int. Cl.
*G02B 6/24* (2006.01)
*G02B 6/28* (2006.01)
*G02B 6/36* (2006.01)

(52) U.S. Cl.
CPC ............ *G02B 6/24* (2013.01); *G02B 6/2852* (2013.01); *G02B 6/3608* (2013.01)

(58) Field of Classification Search
CPC ....... G02B 6/24; G02B 6/2852; G02B 6/3608
See application file for complete search history.

(56) References Cited

U.S. PATENT DOCUMENTS

| | | | |
|---|---|---|---|
| 4,212,512 A | 7/1980 | Hodge | |
| 4,264,126 A | 4/1981 | Sheem | |
| 4,351,585 A | 9/1982 | Winzer et al. | |
| 4,431,260 A * | 2/1984 | Palmer | G02B 6/2826 359/900 |
| 4,493,528 A | 1/1985 | Shaw et al. | |
| 4,601,541 A * | 7/1986 | Shaw | G02B 6/2826 359/900 |
| 4,784,452 A | 11/1988 | Hodge et al. | |

(Continued)

FOREIGN PATENT DOCUMENTS

| | | |
|---|---|---|
| EP | 0 689 071 A1 | 12/1995 |
| EP | 2 000 795 A2 | 12/2008 |

OTHER PUBLICATIONS

International Search Report for PCT/US2011/029625.

*Primary Examiner* — Ryan Lepisto
*Assistant Examiner* — Erin Chiem
(74) *Attorney, Agent, or Firm* — Bo Huang (57) ABSTRACT

An apparatus for coupling an optical fiber embedded within a member to a waveguide is disclosed. The embedded optical fiber has a core and a cladding surrounding the core. A block includes an engagement surface for positioning adjacent the member to facilitate removal of a portion of the cladding surrounding the core of the embedded optical fiber, a monitoring region adjacent which a portion of a waveguide is positioned, and a waveguide having a first section positioned at the monitoring region and a second section configured to be connected to an optical measuring element for measuring a transmission through passing through the waveguide.

20 Claims, 8 Drawing Sheets

(56) References Cited

U.S. PATENT DOCUMENTS

| | | | |
|---|---|---|---|
| 4,898,444 | A | 2/1990 | Grimes et al. |
| 5,026,411 | A | 6/1991 | Coyle, Jr. et al. |
| 5,533,155 | A | 7/1996 | Barberio et al. |
| 6,490,391 | B1 | 12/2002 | Zhao et al. |
| 6,719,608 | B1 * | 4/2004 | Koinkar ............... B24B 19/08 451/460 |
| 6,952,505 | B2 * | 10/2005 | Aldridge et al. ............... 385/14 |
| 7,157,016 | B2 * | 1/2007 | Steinberg ............... B81C 1/00 216/24 |
| 7,668,414 | B2 | 2/2010 | Shemi et al. |
| 2004/0120649 | A1 | 6/2004 | Klosowiak et al. |
| 2008/0212104 | A1 | 9/2008 | Sanders |

* cited by examiner

OPTICAL FIBER TAPPING DEVICE

REFERENCE TO RELATED DISCLOSURE

The Present Disclosure claims priority to U.S. Provisional Patent Application No. 61/316,626, entitled "Optical Fiber Tapping Device," filed on 23 Mar. 2010 with the United States Patent and Trademark Office. The content of the aforementioned Patent Application is fully incorporated in its entirety herein.

BACKGROUND OF THE PRESENT DISCLOSURE

The Present Disclosure relates generally to optical fiber tapping devices and, more particularly to a device for tapping an optical fiber embedded within a structure.

Composite structures such as panels and beams are used in many applications including the aerospace and automotive industries. In some applications, it is desirable to embed optical fibers within the composite material, either as paths for communication or as fiber optic sensors such as for monitoring the strain to which the composite material user has been subjected.

Composite structures are typically formed of a plurality of sheets or plies of fabric-like material with a bonding agent between or around the plies. During the forming or layup process, the plies are positioned in a desired pattern with the bonding agent between each of the plies and optical fibers may be positioned in a desired location between the plies. Depending upon the process being used, the structure is then typically heated or cured at an elevated temperature, which in some instances may occur at approximately 350° C.

In some instances it is desirable to tap or split the optical fibers at a location other than at an end of a structure. In such case, the tap is made from or through the surface of the composite structure. In doing so, a portion of the composite material must be removed and the desired optical fiber (typically referred to as a trunk or bus) located within the composite mat or plies. Since the strength of the composite material is dependent upon the integrity and structure of the plies, it is typically desirable to carry out such locating and tapping processes with minimal impact on the structure of the composite material. In addition, when tapping a trunk fiber, the trunk fiber path is sometimes broken, thus rendering the remaining or downstream portion of the trunk fiber inoperative. An improved structure and method for tapping optical fibers along or through a surface of a composite structure with minimal impact on the composite material and the trunk fiber is desired.

SUMMARY OF THE PRESENT DISCLOSURE

An optical fiber positioning assembly is provided for embedding within a structure. The positioning assembly includes a fiber holder with an inner bore and an outer surface. The inner bore is configured to receive a length of optical fiber therein. A removable armature is positioned about a portion of the outer surface of the fiber holder and is removably positioned around a portion of the fiber holder.

If desired, the removable armature may be chemically removable. The removable armature may be formed of glass and may be chemically removable through contact with acetic acid. The removable armature may be slidably removable from the fiber holder by movement along the fiber holder in a direction generally parallel to a longitudinal axis through the inner bore of the fiber holder. The removable armature may be formed of a molded silicone material. An adhesion agent may be located between the fiber holder and the removable armature to increase the force required to remove the removable armature from the fiber holder. A plurality of spaced apart, generally parallel fiber holders may be provided with each configured to receive a length of an optical fiber therein. The removable armature may be positioned about a portion of each of the fiber holders.

If desired, the removable armature may be formed of a molded silicone material. An alignment block may be secured to at least some of the fiber holders. The alignment block may be positioned about one section of the fiber holders and the removable armature may be positioned about another section of the fiber holders. The alignment block may include an alignment guide and access to the alignment guide may be limited by the removable armature. The fiber holder may be generally tube shaped. The fiber holder may be a silica capillary with an inner bore having a diameter of approximately 125 microns and an outer surface having a diameter of approximately 1.25 millimeters.

An assembly may include a composite structure having a plurality of layers and an edge including an opening therein. An optical fiber may be embedded within the composite structure with an alignment member having a bore extending therethrough and including first and second sections. The first section is positioned within the opening of the composite structure, and the second section extends out of the composite structure and is configured to receive a mating optical fiber member. A fiber holder has an inner bore and is positioned within the first section of the alignment member and a length of the optical fiber is located within the inner bore of the fiber holder.

If desired, a plurality of spaced apart, generally parallel fiber holders may be provided with each having a length of an optical fiber therein. Each fiber holder being positioned within the opening of the edge of the composite structure. An alignment block may be provided within the composite structure and secured to at least some of the fiber holders. A plurality of alignment bores may be provided with a first section of each alignment bore being positioned within the opening of the composite structure, and a second section of each alignment bore extending out of the composite structure and being configured to receive a mating optical fiber member therein.

A method of terminating an embedded optical fiber may include providing an optical fiber positioning assembly with a fiber holder having a length of optical fiber therein and a removable armature positioned about a portion of the fiber holder. A structure may be formed with the optical fiber positioning assembly embedded therein and extending across a cut line along which the structure will be cut. The structure may be cut along the cut line and through the optical fiber positioning assembly to expose a remaining portion of the removable armature positioned adjacent an edge of the structure. The remaining portion of the removable armature may be removed from adjacent the edge of the structure to create an opening in the edge of the structure with an operative portion of the fiber holder and an operative portion of the optical fiber located therein.

If desired, an exposed end of the operative portion of the optical fiber may be polished. An alignment sleeve having first and second sections may be provided and, after the removing step, the first section of the alignment sleeve may be inserted into the opening in the edge of the structure while maintaining the second section outside the opening in the edge and with the exposed end of the optical fiber positioned within the first section of the alignment sleeve. The removing step may include sliding the removable armature from the operative portion of the fiber holder. The sliding step may include sliding the removable armature in a direction generally parallel to a longitudinal axis of the optical fiber. The removing step may include chemically removing the removable armature. The removable armature may be formed of glass and the removing step may include exposing the removable armature to acetic acid.

BRIEF DESCRIPTION OF THE FIGURES

The organization and manner of the structure and operation of the Present Disclosure, together with further objects and advantages thereof, may best be understood by reference to the following Detailed Description, taken in connection with the accompanying Figures, wherein like reference numerals identify like elements, and in which.

DESCRIPTION OF THE PREFERRED EMBODIMENTS

While the Present Disclosure may be susceptible to embodiment in different forms, there is shown in the Figures, and will be described herein in detail, specific embodiments, with the understanding that the Present Disclosure is to be considered an exemplification of the principles of the Present Disclosure, and is not intended to limit the Present Disclosure to that as illustrated.

In the embodiments illustrated in the Figures, representations of directions such as up, down, left, right, front and rear, used for explaining the structure and movement of the various elements of the Present Disclosure, are not absolute, but relative. These representations are appropriate when the elements are in the position shown in the Figures. If the description of the position of the elements changes, however, these representations are to be changed accordingly.

Figure 1:
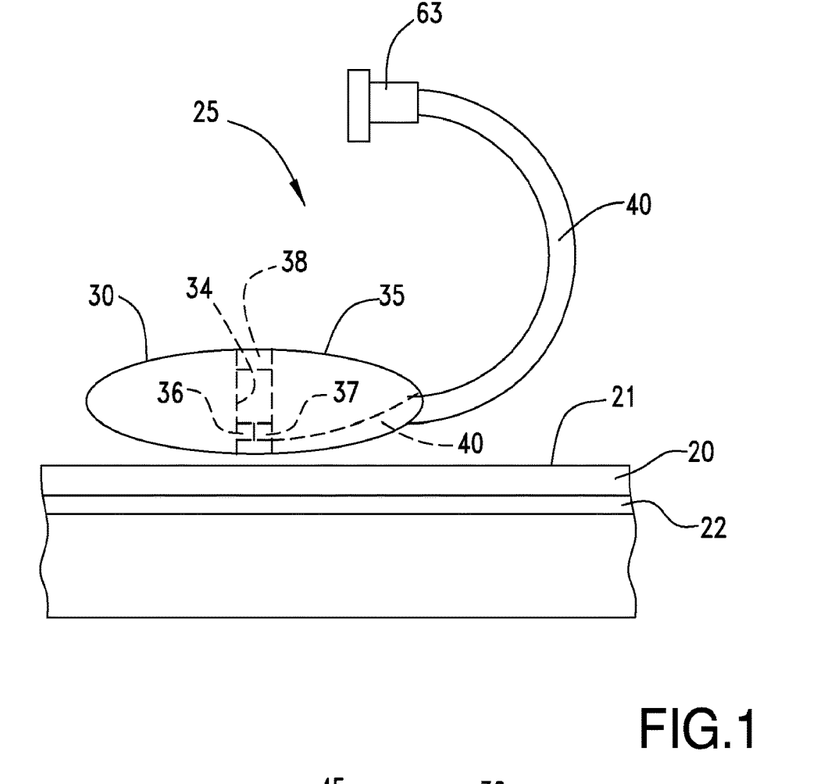
FIG. 1 is a somewhat schematic view of a polishing and optical fiber alignment member positioned adjacent a composite structure having a length of optical fiber positioned therein.
Figure 2:
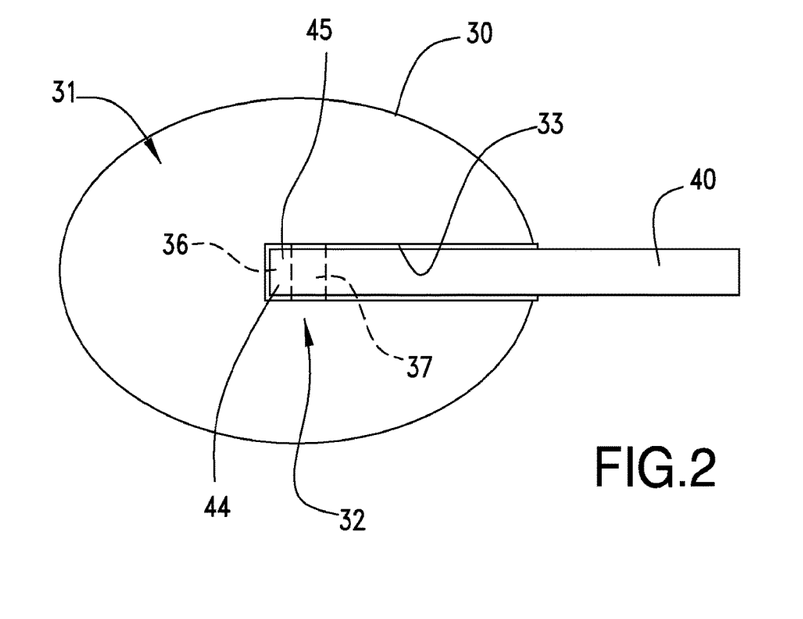
FIG. 2 is a bottom view of a portion of the polishing and optical fiber alignment member of FIG. 1.

Referring to FIGS. 1 and 2, a polishing and optical fiber alignment member 25 is depicted adjacent a composite structure 20 with a length of an optical fiber 22 (such as a trunk or bus fiber) embedded therein. Optical fiber 22 (FIG. 10) is depicted as a single mode optical fiber with a core 23 of approximately 9 microns in a diameter and a surrounding cladding layer 24 of approximately 125 microns in diameter. Member 25 includes a block 30, a waveguide 40 and may be connected to or in communication with an optical measuring device 45. Block 30 is configured to polish or abrade the surface 21 of the composite structure 20 as well as a portion of the trunk optical fiber 22 and subsequently accurately position and secure waveguide 40 relative to trunk optical fiber 22. Composite structure 20 may be a panel, a beam or any other type of member.

Figure 3:
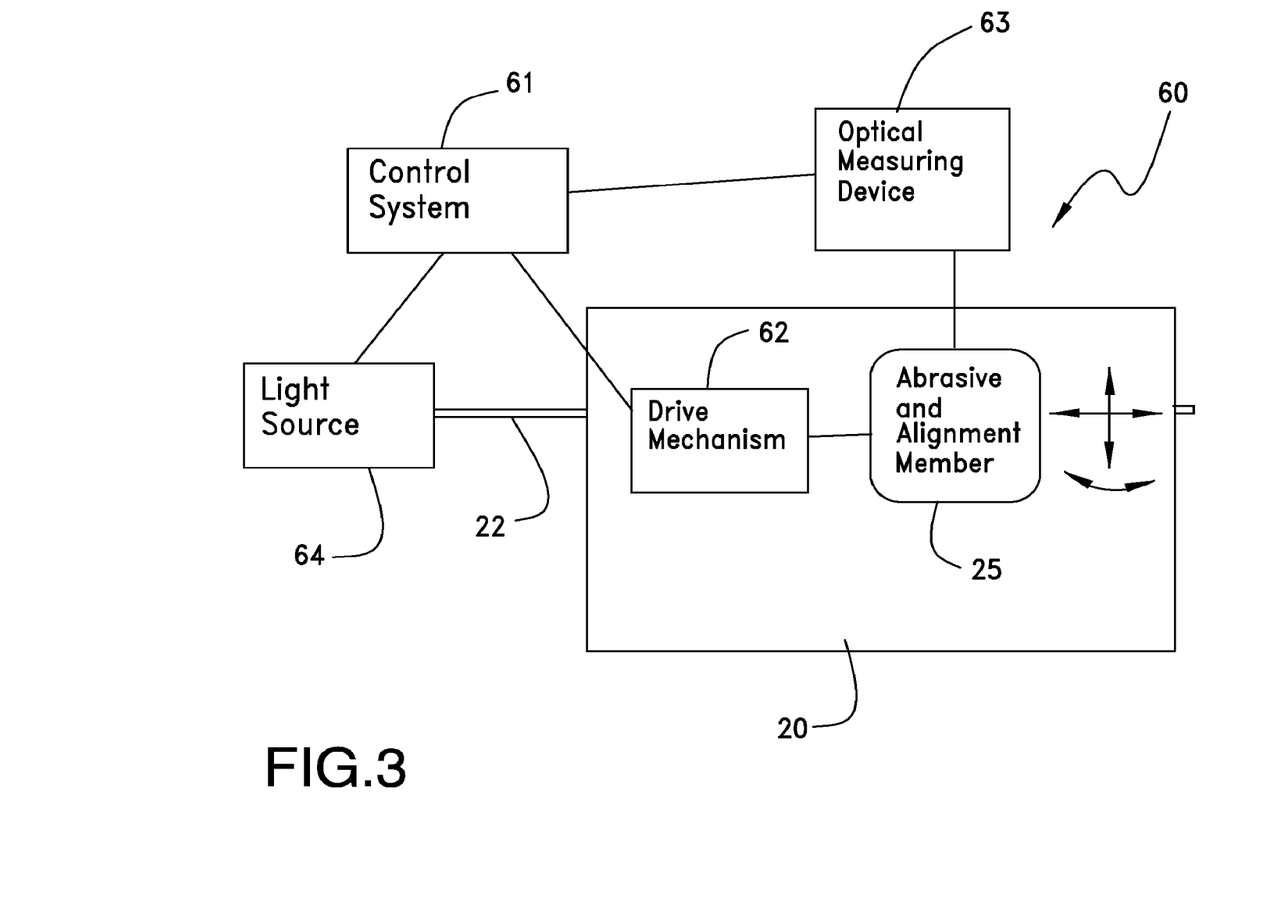
FIG. 3 is a schematic top plan view of a system including the polishing and alignment member of FIG. 1 for removing a portion of the surface of a composite structure and aligning a tap optical fiber member.

Referring to FIG. 3, a system 60 is shown with polishing and optical fiber alignment member 25 mounted on a composite panel 20 having an optical fiber 22 embedded therein. The entire system may be controlled by a control system 61 that is connected to block drive mechanism 62, optical measuring device 63 and light source 64. Drive mechanism 62 is connected to and drives polishing and alignment block 30 to permit automated movement of such block in both a translational (x- and y-axes) as well as in a rotational manner. Movement along the z-axis may be controlled by gravity or, if desired, drive mechanism 62. Optical measuring device 63 is connected to waveguide 40 of block 30 and control system 61 may use data from the measuring device to control the entire system 60 as described below. Light source 64 is connected to optical fiber 22 in order to provide a known input light transmission into the optical fiber which is used for subsequent comparison to the amount of light being diverted or tapped into waveguide 40.

It should be noted that in this description, representations of directions such as up, down, left, right, front, rear, and the like, used for explaining the structure and movement of each part of the disclosed embodiment are not intended to be absolute, but rather are relative. These representations are appropriate when each part of the disclosed embodiment is in the position shown in the figures. If the position or frame of reference of the disclosed embodiment changes, however, these representations are to be changed according to the change in the position or frame of reference of the disclosed embodiment.

Generally, during the process of manufacturing the composite panels or structures, the various plies or layers (not shown) are stacked and consolidated to form the desired composite structure 20 with various optical fibers 22 positioned between certain layers. The optical fibers 22 may be at or near the surface 21 of the composite structure 20 or may be further within the structure. In some instances, it is desirable to tap or couple the embedded trunk or bus optical fibers 22 that extend through the composite structure by removing a portion of the composite structure between the optical fiber 22 and the surface 21 of the composite structure in order to gain access to the optical fiber and then tapping into or diverting the optical fiber 22 into a tap optical fiber or waveguide 40. Depending upon the application, it may be desirable for the optical fibers 22 to be positioned relatively close to surface 21 of composite structure 20 so as to minimize the amount of composite material that must be removed in order to gain access to optical fiber 22. Optical fibers 22 may be single mode, multi-mode or part of a multi-fiber cable. The structure of member 25 and the method of use is similar for each type of fiber.

Block 30 serves as an abrasive or polishing member and also carries the waveguide for monitoring the depth of abrasion of the trunk optical fiber and the alignment of the trunk and tap optical fibers. Block 30 is generally oval in shape and includes a slightly convex lower surface 31 that functions to engage and abrade or polish the surface 21 of composite structure 20 as well as polish a side (top as viewed in FIG. 1) of optical fiber 22 as described below. Various other shapes and configurations could be utilized. An abrasive material such as a polishing liquid, powder or slurry is typically applied between engagement surface 31 and the material to be abraded or polished (e.g. composite 20 or optical fiber 22). Block 30 also includes a region 32 through which light may pass for monitoring various light transmissions as described below. While the monitoring region 32 may be located within or be bounded by engagement surface 31, the monitoring region could be spaced from engagement surface 31.

Block 30 includes a channel 33 in the lower engagement surface 31 and in which a portion of a side-polished tap optical fiber 40 may be positioned. Depending upon the circumstances, side polished tap optical fiber 40 may be removably mounted or permanently fixed within channel 33. The side polished end 45 of tap optical fiber 40 is aligned with monitoring region 32.

Figures 10, 11, 12, 13, 14:
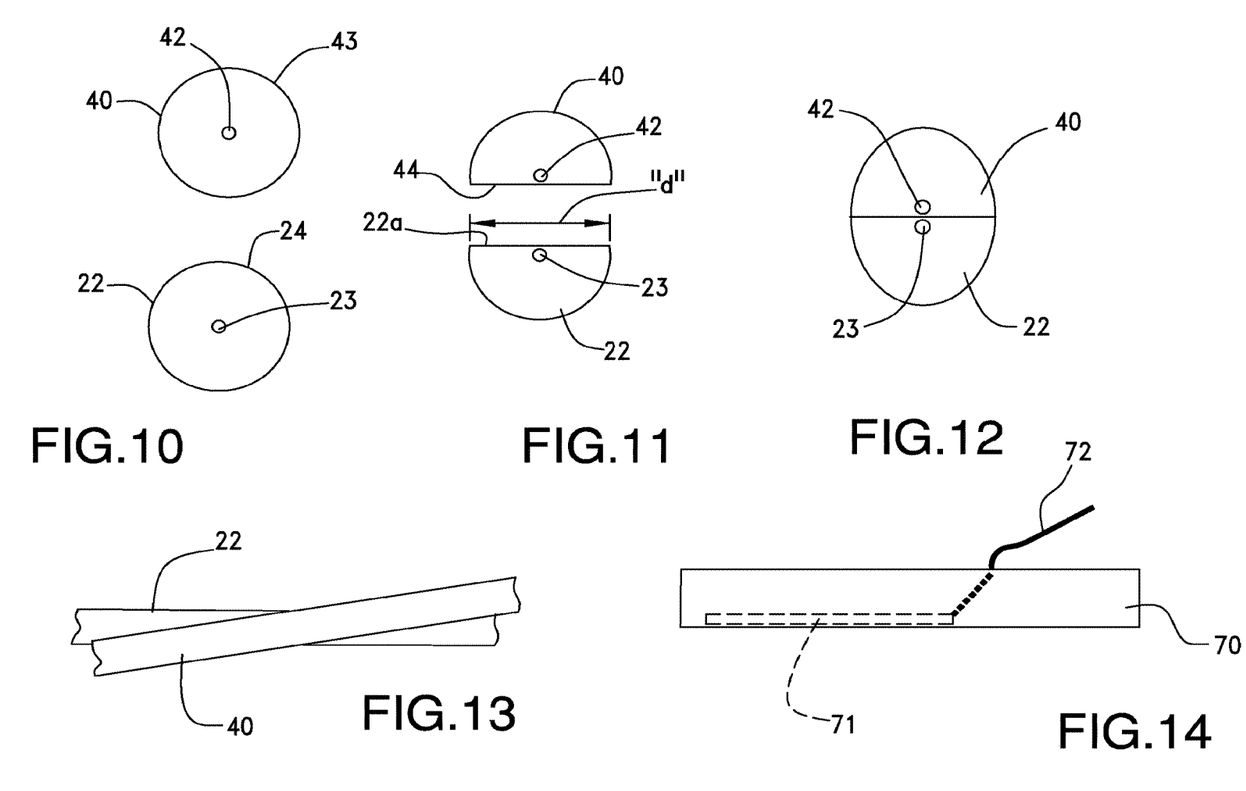
FIG. 10 is an end view of a pair of trunk and tap optical fibers.
FIG. 11 is an end view of a pair of trunk and tap optical fibers after side polishing.
FIG. 12 is an end view of the pair of side polished trunk and tap optical fibers coupled together.
FIG. 13 is a tap plan view of a pair of side polished trunk and tap optical fibers in a skewed condition to reduce coupling.
FIG. 14 is a side view of an alternate embodiment of a polishing and alignment member.
Figure 15:
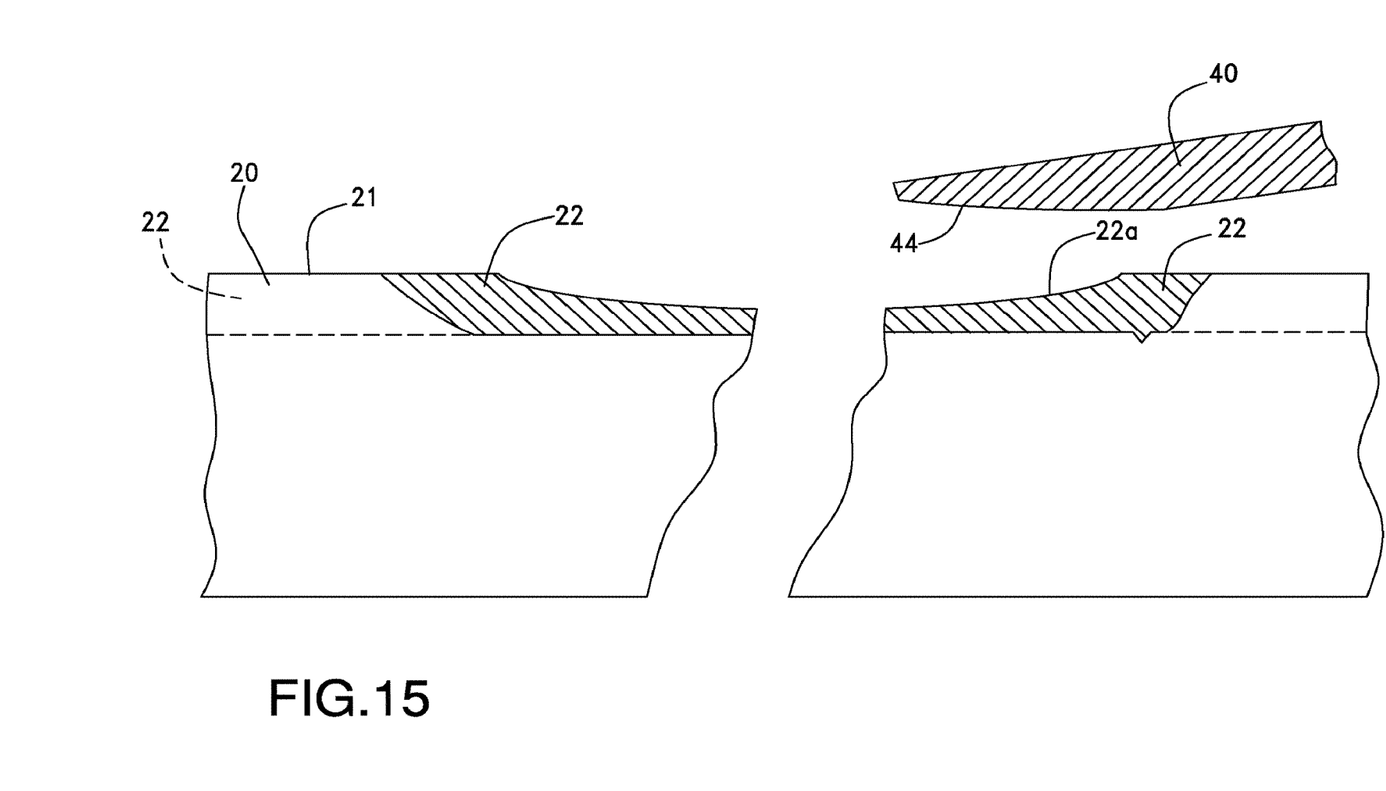
FIG. 15 is a cross-sectional view of the composite structure with a portion of the structure removed, the trunk optical fiber side polished and the tap optical fiber in position prior to coupling.
Figure 16:
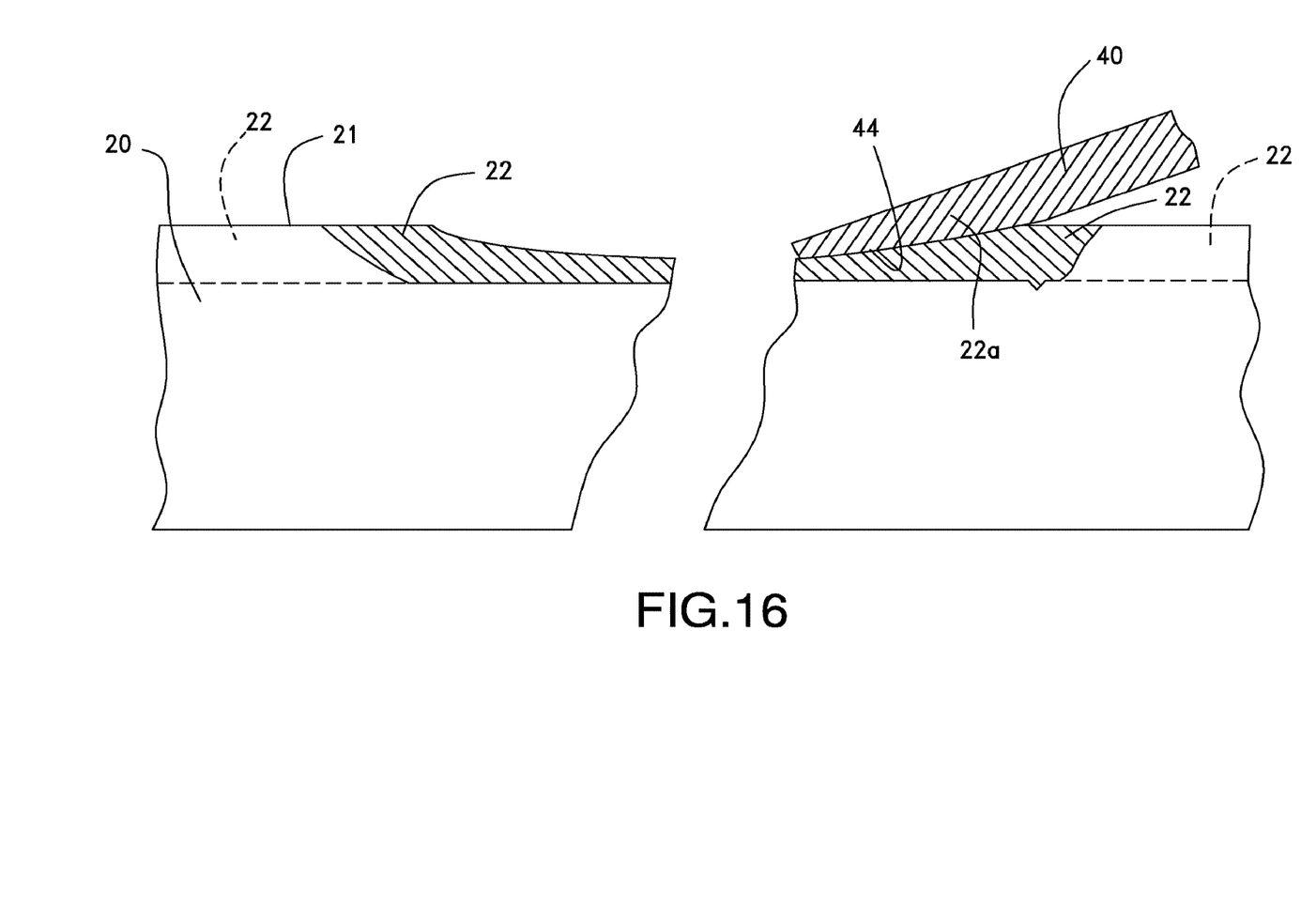
FIG. 16 is a cross-sectional view similar to FIG. 15 but with the side polished trunk optical fiber and the side polished tap optical fiber coupled together.

Waveguide 40 is depicted as a single mode side polished tap fiber (FIG. 10) having a central core 42 of approximately 9 microns in diameter and a cladding layer 43 of approximately 125 microns in diameter surrounding the core. One edge of the cladding is removed and polished so as to leave a generally flat surface 44 (FIGS. 1, 2, 11). When used with a single mode fiber, a small amount of cladding may remain on the side polished side of core 42 since the evanescent field of single mode optical fibers will pass through a relatively thin layer of cladding. For example, when used with a single mode fiber having a core diameter of 9 microns, the evanescent field will extend beyond the core to a diameter of 14 microns. If the side-polished optical fiber 40 is a multi-mode fiber, all of the cladding 43 would be removed. The side polished end 45 of optical fiber 40 is positioned in channel 33 with end 45 approximately parallel to the lower surface of block 30 and the opposite end 46 of optical fiber 40 connected to optical measuring device 63.

If desired, block 30 may also include a bore 34 aligned with monitoring region 32 and extending from upper surface 35 of block 30 down to channel 33. At the lower edge of bore 34 adjacent channel 33, an illuminating LED 36 and a photo detector 37 may be positioned. Appropriate circuitry is provided in order to drive LED 36 and to operate photo detector 37 in order to monitor the reflection off of surface 21 of composite structure 20. Upon reaching a desired change in the signal detected by the photo detector 37, a signal could be sent to indicator LED 38 on top of block 30 and/or to an appropriate computer control system 61 that is responsible for the movement of block 30. For example, the composite material is typically non-reflective (black) while the embedded optical fiber 22 is substantially transparent. Accordingly, the photo detector 37 will detect a change in the light from LED 36 reflected back from structure 20 once a sufficient amount of the structure is removed and optical fiber 22 is uncovered. A signal could be sent to the indicator LED 38 and the control system 61 could also send a signal shutting down the drive mechanism 62 and indicating that appropriate actions, such as cleaning the optical fiber and changing the abrasive material, are required.

Figure 4:
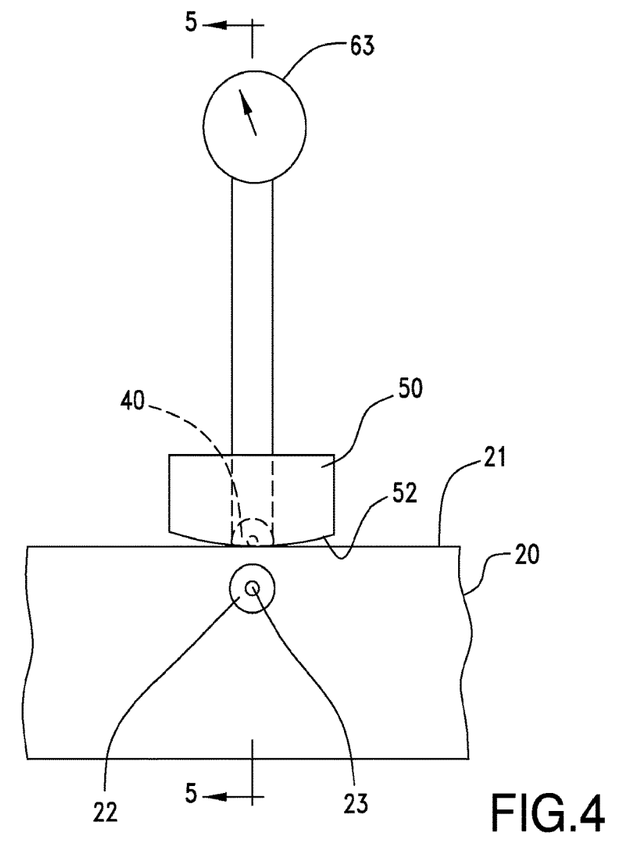
FIG. 4 is an end view of an alternate embodiment of the polishing and optical fiber alignment member of FIG. 1 positioned on a composite structure having a length of optical fiber positioned therein.
Figure 5:
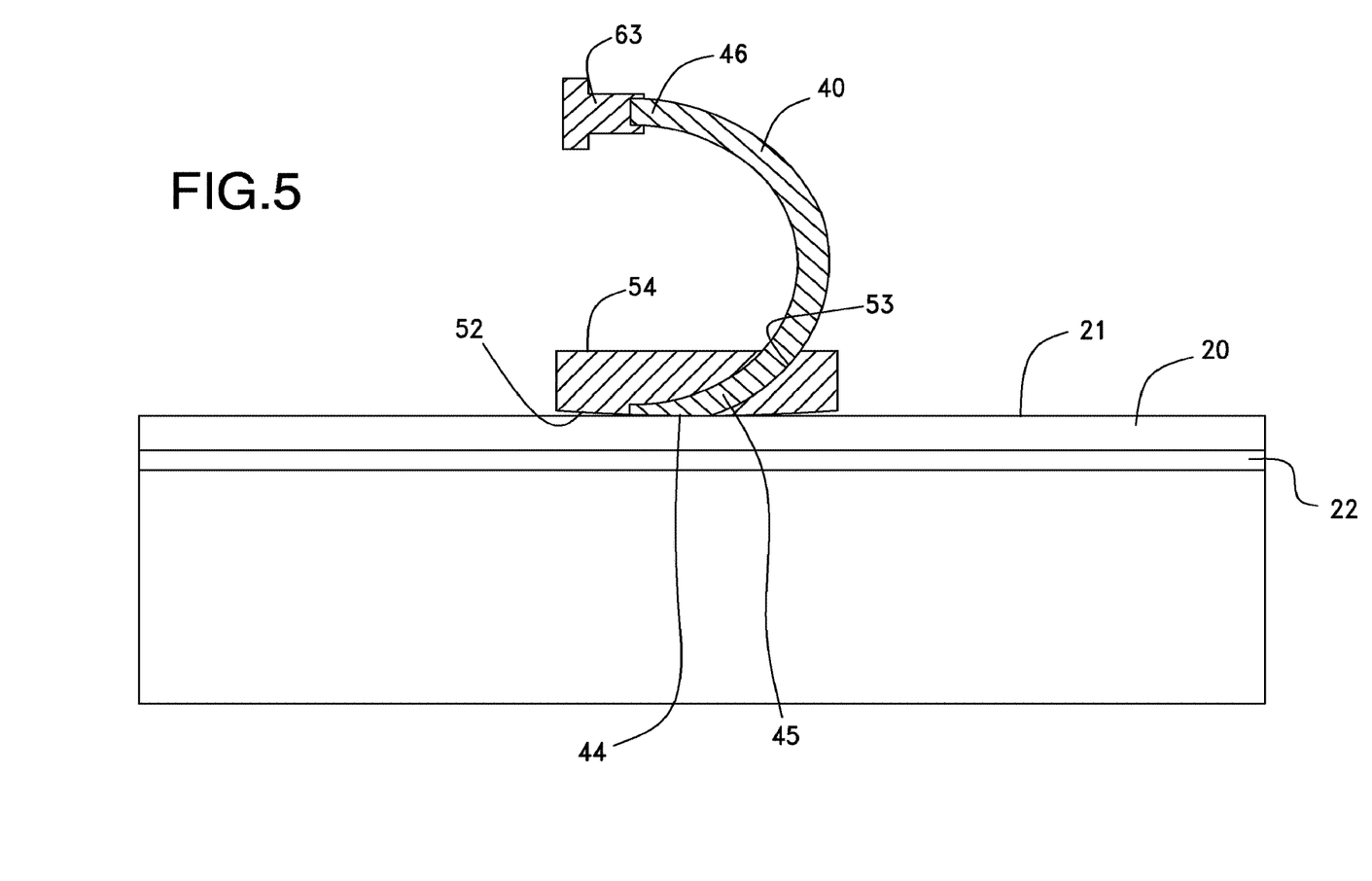
FIG. 5 is a cross-sectional view of the polishing and optic fiber alignment member and composite structure taken generally along line 5-5 of FIG. 4.
Figure 6:
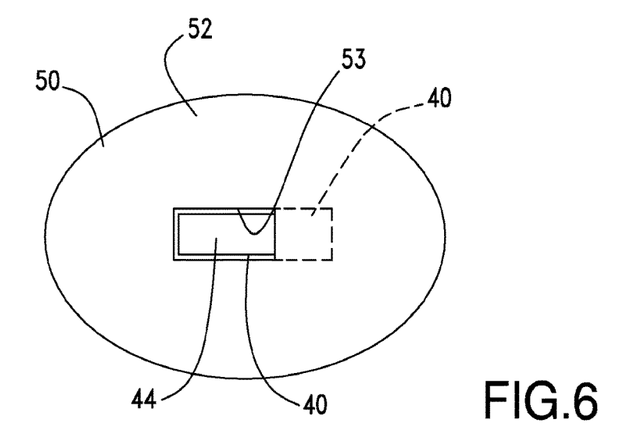
FIG. 6 is a bottom view of a portion of the polishing and optic fiber alignment member of FIG. 3.

Referring to FIGS. 4-6, an alternate embodiment of polishing and alignment block 50 is disclosed. Block 50 is similar to block 30 in that it also includes a slightly convex lower engagement or polishing surface 52 and has a side polished optical fiber mounted thereto. However, rather than including a channel as shown in FIGS. 1-2, block 50 includes a bore 53 extending from upper surface 54 of block 50 to lower surface 52 in which the tap optical fiber 40 is positioned. Tap optical fiber 40 is connected to an optical measuring element or meter 45 for measuring the amount of light that is being diverted from trunk optical fiber 22 to tap optical fiber 40. If desired, block 50 may include the LED's 26, 28 and the photo detector 27 as described above relative to the embodiment of FIG. 1. In still another embodiment, the waveguide and optical measuring device 63 of the block may in some instances be replaced by a photo detector to measure light emanating from trunk optical fiber 22 during the polishing process.

Optical measuring device 63 may be configured to measure the amplitude or power of particular frequencies or may be configured in other manners in order to measure the amount or percentage of the signal transmission from light source 64 that is being diverted into optical fiber 22. In some situations, it may be desirable to match the light characteristics, such as frequency and data rates, generated by light source 64 to the type of signal transmission that will ultimately be sent through trunk optical fiber 22 and tap optical fiber 40 when the composite structure is in use. Further, it may be desirable to use a pulsed light of a specific frequency as the input from light source 64 so that the optical measuring device can be used to analyze only specific frequencies and eliminate the impact of ambient light.

Figure 7:
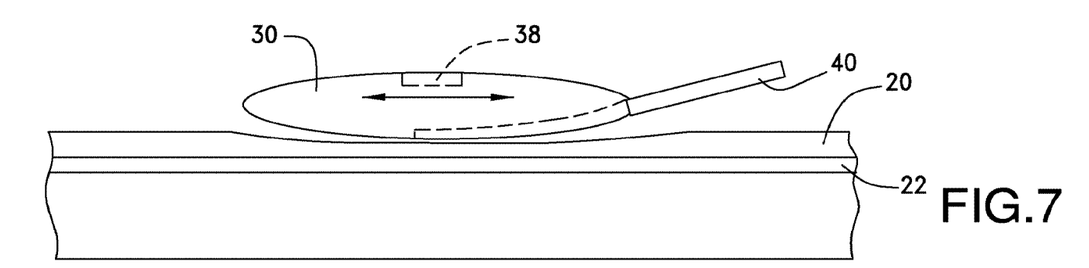
FIG. 7 is a somewhat schematic side elevational view similar to that of FIG. 1 except that the polishing and optical fiber alignment member has begun abrade a portion of the composite member.
Figure 8:
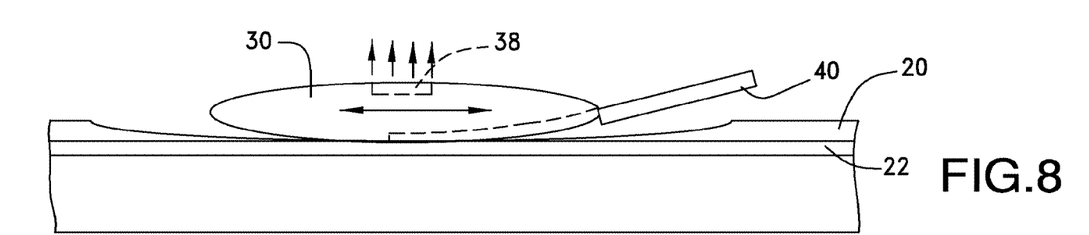
FIG. 8 is a side elevational view similar to that of FIG. 7 with the polishing and optical fiber alignment member abraded through substantially all of the composite structure between the surface of the composite structure and the trunk optical fiber.
Figure 9:
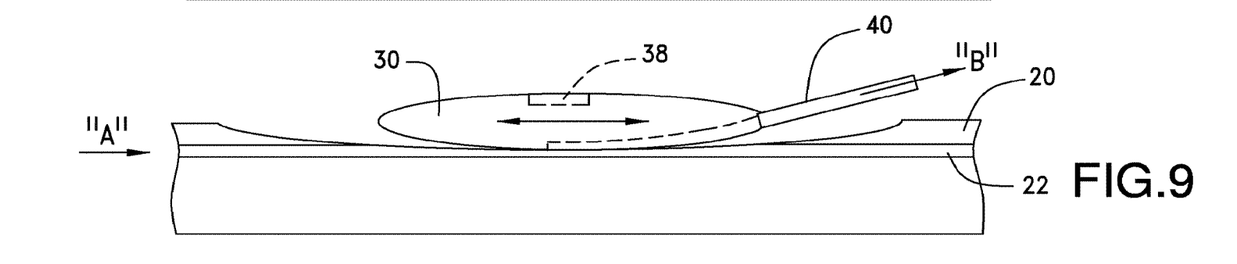
FIG. 9 is a side elevation view similar to that of FIG. 8 but with the polishing and optical fiber alignment member polishing the cladding of the optical fiber.

Referring to FIGS. 7-9, in operation, the trunk optical fiber 22 to be tapped is generally located within structure 20 and the block 30 is generally positioned above the trunk optical fiber 22 and attached to drive mechanism 62 for moving block 30 in both the x- and y-axes as well as permitting axial rotation. Movement along the z- or vertical axis may be driven by gravity or drive mechanism 62. Light source 64 is connected to optical fiber 22 and a desired signal or light source is transmitted through optical fiber 22 to serve as a known input. If desired, light source 64 may be connected to optical fiber 22 through the use of a large core optical fiber in order to simplify the alignment process.

A relatively course abrasive material such as liquid powder or slurry is positioned between engagement surface 31 of block 30 and surface 21 of composite structure 20. Block 30 is then moved in a desired manner in order to abrade or polish the surface of the composite structure. As the block moves along upper surface 21, LED 36 may be engaged in order to illuminate surface 21 of composite structure 20.

Photo detector 37 may be used to monitor light reflecting back from surface 21. Inasmuch as the composite material 20 is typically not particularly reflective of light, the photo detector 37 will generally detect a predetermined amount of reflective light during the polishing of surface 21. However, as block 30 finishes polishing through composite 20 and reveals optical fiber 22, the light reflected back through photo detector 37 will change due to the transparent nature of optical fiber 22 and the differences in reflection between structure 20 and optical fiber 22. This will result in a change in the output from photo detector 37 that will be detected by control system 61 and a signal may then be sent to indicator LED 38 (FIG. 8) and/or to drive mechanism 62 that drives the block 30 to stop the polishing process.

In the alternative, the abrasion or removal of the composite material 20 could be preformed manually or with a mechanism that does not include a waveguide 40 so long as the trunk optical fiber 22 is located without damaging the composite material or the trunk fiber.

Once the trunk optical fiber is located, a different, finer abrasive material may be utilized and applied to lower surface 31 of block 30 in order to more slowly abrade and polish the top surface of trunk optical fiber 22. Examples of such materials could include a liquid with an abrasive such as silicon carbide, aluminum oxide, cerium oxide or diamond therein to create a slurry. As described below, it may be desirable to control the refractive index of the abrasive material. As the cladding 24 of trunk optical fiber 22 is removed, light traveling from light source 64 through trunk optical fiber 22 as indicated by arrow "A" in FIG. 9 will begin to be redirected or tapped into tap optical fiber 40 as shown by arrow "B." The amount of light traveling through the tap optical fiber 40 is monitored by optical measuring device 63 as the fine polishing process continues until the desired amount of light is being removed from trunk optical fiber 22 and redirected into tap optical fiber 40. At such point, the control system 61 sends a signal to the drive mechanism 62 and polishing of the trunk optical fiber is completed.

In an alternative process, it may be possible to determine the thickness of the cladding 24 by measuring the length ("d" in FIG. 11) of exposed cladding laterally or across the optical fiber. In other words, since the diameters of each of the core 23 and cladding 24 of the optical fiber 22 are known, a known thickness of the remaining cladding can be obtained by stopping the polishing process once the length of the exposed cladding reaches a predetermined length. This can be accomplished by periodically moving block 30 laterally across optical fiber 22 once the fiber has been exposed and using the photo detector to measure the distance between the outside top edges of the exposed optical fiber. Once the distance reaches a predetermined length "d", the polishing process can be terminated.

When using single mode optical fiber with a 9 micron core, the evanescent field will travel beyond the core (and into the cladding) to a diameter of approximately 14 microns. Therefore, it is desirable to remove a sufficient amount of cladding from both the trunk optical fiber 22 and tap optical fiber 40 so that the evanescent waves from each core will overlap. In order to do so, the thickness of the cladding at the side polished surface should be 2.5 microns or less. By controlling or monitoring the thickness of the cladding as it is removed from the trunk optical fiber 22, the amount coupling between the trunk optical fiber 22 and the tap optical fiber 40 may be controlled. If the optical fiber is multi-mode fiber, the system and process of removing the cladding is similar to that described above but all of the cladding from one side of each of the trunk and tap optical fibers will typically be removed.

Once a sufficient amount of cladding has been removed, block 30 is removed from composite structure 20 and the lower or engagement surface 31 and side polished waveguide 40 of block 30 and the composite panel 20 as well as the side polished portion (22a) of trunk optical fiber 22 are all cleaned. Block 30 is then repositioned on composite panel 20 and the side polished trunk optical fiber 22 and the side polished tap optical fiber 40 are generally aligned while optical measuring device 63 measures the amount or percentage of light being redirected through tap optical fiber 40. The coupling between trunk optical fiber 22 and tap optical fiber 40 is a function of the depth or amount of cladding removed from the optical fibers as well as the linear length or amount of the side polished fibers positioned next or adjacent to each other. Accordingly, the coupling between the trunk and tap optical fibers may be adjusted by moving the two optical fibers axially or by rotating them relative to each other (FIG. 13). In other words, if, after cleaning the junction between the side polished trunk and tap optical fibers 22, 40, too much of the cladding has been removed so that too much of the signal passing through trunk optical fiber 22 is being diverted into tap optical fiber 40, the coupling may be reduced by moving the tap optical fiber 40 linearly or rotationally in order to reduce the amount the side polished sections overlap. The trunk and tap optical fibers are first generally aligned, and then drive mechanism 62 is instructed by control system 61 to move the tap optical fiber 40 linearly or rotationally relative to trunk optical fiber 22 while monitoring the output at optical measuring device 63. After the desired amount of coupling is achieved (i.e., the desired percentage of light from light source 64 is being redirected or tapped by tap optical fiber 40), the drive mechanism holds the block 30 in place and the tap optical fiber 40 is fixed to trunk optical fiber 22.

Various manners of fixing or bonding the trunk and tap optical fibers 22, 40 together may be utilized once they have been aligned such as adhesives and mechanical splices (for example, UV cured or other types of epoxy, or a low melt or other type of solder glass interface) as well as fusion splices in which case the interface of the fibers is melted together (for example, through the use of a laser). If desired, the LED's 36, 38 and photo detector 37 could be configured to be removable from block 37 and a laser could be used to project light or UV energy through block 30 (and through waveguide 40) in order to secure trunk fiber 22 to tap fiber 40.

Locating and tapping a multi-fiber cable is complicated by the fact that, in most situations, the individual fibers of the multi-fiber cable will not be embedded at exactly the same depth within the composite material. In order to be able to locate and tap each individual fiber of the multi-fiber cable, the block is configured generally as described above but with a narrow linear polishing or engagement surface. The width of the linear polishing surface is slightly larger than the diameter of the individual optical fibers of the multi-fiber cable (and less than the diameter of the fiber plus the distance or pitch between adjacent fibers) so that each fiber can be polished without contacting an adjacent fiber. The waveguide or photo detector of the block is aligned with the narrow linear engagement surface and could be positioned at an end of the engagement surface or somewhere along the surface between the opposite ends.

Light from the light source is projected into all of the optical fibers and, after applying the desired, relatively course abrasive material, the block is rotated and translated on the composite material to abrade or polish the composite material until one of the fibers of the multi-fiber cable is uncovered. The block is then rotated so that the linear polishing surface of the block is aligned with the axis of the exposed optical fiber and the fine abrasive material is applied to the junction of the exposed optical fiber and the linear polishing surface. The block (and thus the linear polishing surface) is moved linearly along or parallel to the axis of the exposed optical fiber until the desired amount of cladding has been removed. Monitoring of the cladding removal process is achieved through the waveguide and optical measuring device generally as described above with respect to the single fiber embodiment.

Once the first optical fiber is sufficiently polished, the linear polishing surface is moved laterally a distance equal to the distance or pitch between the optical fibers of the multi-fiber cable and the polishing process repeated until all of the optical fibers have been uncovered and a sufficient amount of cladding removed from each optical fiber. Since the adjacent optical fibers are still embedded within the composite material, each time the linear polishing or engagement surface is moved laterally, it will be unknown whether the linear polishing surface is actually aligned with an embedded optical fiber as the previously exposed fiber could have been on an end of the multi-fiber cable. Accordingly, it is desirable to monitor the polishing process so that the polishing does not extend too deeply into the composite material.

Since, as described above, each fiber of the multi-fiber cable is at a slightly different depth, it is likely very difficult to use a multi-fiber cable to efficiently tap the fibers of the multi-fiber cable. Accordingly, once all of the optical fibers have been polished to their desired depth, a side polished individual tap optical fiber is connected to each optical fiber of the multi-fiber cable. Each tap optical fiber is positioned within a member to hold the tap fiber in place during the alignment process and the tapping process is repeatedly carried out as described above with respect to the single fiber embodiment. However, since the spacing between the fibers in the multi-fiber cable is small, it may be desirable to linearly stagger the connections between the tap optical fibers and the optical fibers of the multi-fiber cable. More specifically, a first tap fiber is aligned and secured to one of the fibers of the multi-fiber cable generally as described above with respect to the single fiber embodiment. This process is repeated with the interconnection between the second tap fiber and a second fiber of the multi-fiber cable moved linearly along the axis of the multi-fiber cable so that the second tap fiber may be secured to the second fiber of the multi-fiber cable without physical interference from the first tap fiber. The process is repeated until all of the fibers of the multi-fiber cable have been tapped and with the positioning of the taps at multiple (two or more) locations along the axis of the multi-fiber cable. Since the optical fibers of the multi-fiber cable may be tapped at different axial locations, it may be desirable to either polish the fibers at different locations along the cable or to polish a greater length of the cladding as compared to that polished in conjunction with the with the single fiber embodiment.

It should be noted that light will tend to be reflected back when moving from a first medium having a first refractive index to a second medium having a second, lower refractive index. Thus, if the abrasive material between the trunk optical fiber 22 and the block 30 (and thus the side polished end 45 of trunk optical fiber 40) has a refractive index less than that of the core, it will tend to reflect light back into the core. However, since the abrasive material is removed after polishing and prior the final coupling of the trunk optical fiber to the tap optical fiber, measurement with the abrasive material in place will result in misleading measurements if the refractive index of the abrasive material is less than that of the core. In other words, since the abrasive material will be removed before the trunk optical fiber 22 is coupled to the tap optical fiber 40, it is desirable to measure or model the coupling of the two optical fibers during the polishing process in as close a manner as possible to their state when they will be permanently coupled together. Accordingly, it will often be desirable (but not necessary) to minimize the impact of the abrasive material by choosing such material so that it has a refractive index greater than or equal to that of the optical fiber core. In some circumstances, it may be sufficient if the refractive index of the abrasive material is greater than or equal to that of the cladding (e.g., if the LED's 36, 38 and photo detector 37 are used as described above to determine when the trunk optical fiber 22 is initially uncovered). Similarly, it is desirable for the junction medium (e.g., epoxy, low melt solder glass) that is located between trunk optical fiber 22 and tap optical fiber 40 and used to secure them together has a refractive index greater than or equal to that of the cores 23, 42 of the optical fibers in order to maximize the coupling efficiency between the two fibers.

In still another embodiment, block 70 (FIG. 14) maybe formed of a silica or glass block having one or more waveguides 71 formed within the block. One process for creating such a block 70 having integral waveguides 71 therein utilizes lithography, etching and ion diffusion to form the waveguides. By controlling the depth to which the waveguides are embedded within block 70, the coupling to an embedded optical fiber 22 or multi-fiber cable may be controlled in a manner similar to controlling the thickness of the cladding that remains on the side polished tap optical fiber 40. With such a configuration, channels or recesses in the block through or in which an optical fiber is positioned are no longer necessary. For single mode fibers, the waveguides could be at the surface of the block or slightly below the surface due to the evanescent wave. For coupling to multi-mode fibers, the waveguides would be on the surface of the block. Waveguides 71 may be connected to additional optical fibers 72 and, if desired, additional circuitry may be included within or on block 70.

Although the Present Disclosure provided has been described in terms of illustrated embodiments, it is to be understood that the Present Disclosure is not to be interpreted as limiting. Various alterations and modifications will no doubt become apparent to those skilled in the art after having read the above Present Disclosure. For example, while described in the context of a composite structure, the polishing and optical fiber alignment member disclosed herein could be used with assemblies in which optical fiber are embedded in other types of materials. Numerous other embodiments, modifications and variations within the scope and spirit of the appended claims will occur to persons of ordinary skill in the art from a review of the Present Disclosure.

What is claimed is:

1. An apparatus for coupling an optical fiber embedded within a member to a waveguide, comprising:
   a block having a surface, a portion of which includes an engagement surface, the block further including a monitoring region, and a channel in the engagement surface,
   the waveguide positioned within the channel and aligning with the monitoring region;

the engagement surface of the block configured to position adjacent to the member and abrasively remove material from a portion of the member and the optical fiber; and the waveguide of the block having a first section positioned adjacent to the monitoring region and a second section configured to be connected to an optical measuring element for measuring a transmission passing through the waveguide.

2. The apparatus of claim 1, further including an automated drive mechanism for moving the block in a predetermined manner adjacent the member to remove a portion of the member and a portion of the optical fiber.

3. The apparatus of claim 2, wherein the automated drive mechanism is also configured to move the block in another predetermined manner to align the optical fiber and the waveguide in a predetermined manner.

4. The apparatus of claim 1, wherein the block is formed of metal.

5. The apparatus of claim 1, wherein the block is formed of glass.

6. The apparatus of claim 5, wherein the block includes a plurality of waveguides for communication with a plurality of optical fibers embedded within the member.

7. The apparatus of claim 1, wherein the engagement surface is generally convex.

8. The apparatus of claim 1, wherein the embedded optical fiber is a single mode optical fiber and the embedded optical fiber and the waveguide are coupled by an evanescent field.

9. The apparatus of claim 1, wherein the monitoring region is generally within the engagement surface.

10. The apparatus of claim 1, wherein the monitoring area is spaced from the engagement surface.

11. The apparatus of claim 1, further including an optical measuring element spaced from the monitoring region and in communication with the waveguide for measuring a transmission passing through the waveguide.

12. The apparatus of claim 1, wherein the waveguide is a length of a second optical fiber.

13. The apparatus of claim 12, wherein the waveguide is a length of a second optical fiber and the second optical fiber is removable from the block.

14. The apparatus of claim 13, further including a channel extending from a portion of the engagement surface to an outer surface of the block, the second optical fiber being removably secured within the channel.

15. The apparatus of claim 12, wherein the waveguide is a length of a second optical fiber and the second optical fiber is permanently secured to the block.

16. The apparatus of claim 1, further including a light source and a light detector generally adjacent the monitoring region.

17. The apparatus of claim 16, further including a control system and the light detector being connected to the control system to monitor reflections from the light source.

18. A system for making a coupling connection to an optical fiber embedded generally along a surface of a member to a waveguide, comprising:

a block having a surface, a portion of which includes an engagement surface, the block further including a monitoring region on or within the surface, and a channel in the engagement surface, the waveguide positioned within the channel and aligning with the monitoring region;

the engagement surface of the block configured to position adjacent to the member and abrasively remove material from a portion of the member and the optical fiber;

a second optical fiber removably positioned relative to the block, the second optical fiber having a first section positioned adjacent to the monitoring region of the block and a second section configured to be connected to an optical measuring element; and an optical measuring element configured to communicate with the second optical fiber for measuring a transmission therefrom.

19. The apparatus of claim 18, further including a light source for providing light transmission through the embedded optical fiber.

20. The apparatus of claim 19, wherein the light source provides a pulsed light transmission through the embedded optical fiber.

* * * * *